(12) United States Patent
Cagadas et al.

(10) Patent No.: US 10,891,560 B2
(45) Date of Patent: Jan. 12, 2021

(54) SUPERVISED LEARNING SYSTEM TRAINING USING CHATBOT INTERACTION

(71) Applicant: INTERNATIONAL BUSINESS MACHINES CORPORATION, Armonk, NY (US)

(72) Inventors: Jonathan A. Cagadas, Philadelphia, PA (US); Alexander D. Lewitt, Morrisville, NC (US); Simon D. Mikulcik, Murray, KY (US); Karan Shukla, Plano, TX (US); Leigh A. Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 15/661,923

(22) Filed: Jul. 27, 2017

(65) Prior Publication Data

US 2019/0034824 A1    Jan. 31, 2019

(51) Int. Cl.
*G06N 5/02* (2006.01)
*G06N 20/00* (2019.01)
*H04L 12/58* (2006.01)

(52) U.S. Cl.
CPC .............. *G06N 20/00* (2019.01); *H04L 51/02* (2013.01); *G06N 5/02* (2013.01)

(58) Field of Classification Search
None
See application file for complete search history.

(56) References Cited

U.S. PATENT DOCUMENTS

| 2014/0255895 A1 | 9/2014 | Shaffer et al. |
| 2014/0279050 A1 | 9/2014 | Makar et al. |
| 2016/0110502 A1 | 4/2016 | Bronson et al. |

OTHER PUBLICATIONS

Power Admin LLC, PA Server Monitor, Version 7.0 Ultra, 2017, pp. 366 (Year: 2017).*
Facebook Messenger: https//developers.facebook.com/products/messenger/, downloaded from the Internet Jul. 27, 2017, 7 pages.
Slack: https://api.slack.com/bot-users, downloaded from the Internet Jul. 27, 2017, 17 pages.
Telegram: https://core.telegram.org/bots/api, downloaded from the Internet Jul. 27, 2017, 64 pages.

(Continued)

*Primary Examiner* — Wilbert L Starks
(74) *Attorney, Agent, or Firm* — Conley Rose, P.C.

(57) ABSTRACT

An apparatus comprises a memory and a processor coupled to the memory. The processor is configured to receive input from a cloud service data source, wherein the input comprises at least one data point, analyze the data point via a machine learning model to determine characteristics indicated by the data point, determine whether the characteristics indicated by the data point meet an alert threshold that indicates a problem in a network, generate an alert ticket when the characteristics indicated by the data point meet the alert threshold, wherein the alert ticket indicates the problem in the network, communicate with a user based on contents of the alert ticket, receive feedback from the user relating to the alert ticket, and train the machine learning model according to the feedback received from the user.

20 Claims, 5 Drawing Sheets

(56) References Cited

OTHER PUBLICATIONS

Kik: https://dev.kik.com/#/home, downloaded from the Internet Jul. 27, 2017, 2 pages.
Watson Diaolgue: https://www.ibm.com/watson/developercloud/dialog.html, downloaded from the internet, 5 pages.
"List of IBM Patents or Patent Applications Treated as Related," Jul. 30, 2020, 2 pages.

\* cited by examiner

SUPERVISED LEARNING SYSTEM TRAINING USING CHATBOT INTERACTION

BACKGROUND

The present disclosure relates to the field of machine learning, and more specifically to training a supervised learning system using feedback received from a user through chatbot interaction.

As complexity of cloud-based systems increases, so too does monitoring and maintenance of these systems. In some circumstances, humans perform the monitoring manually, while in other circumstances other systems may aid or fully perform the monitoring. For the systems performing the monitoring to develop rules or guidelines for determining when a problem exists, the systems must be trained. Training the systems may be a time consuming and, sometimes, expensive task.

SUMMARY

Various embodiments presented herein mitigate the delay suffered by currently existing computer systems in responding to user input by performing speculative processing (which may also be referred to as pre-processing and/or pre-fetching) responses to the user input according to portions of the user input analyzed prior to the computer system receiving an entirety of the user input.

In an embodiment of the present disclosure, an apparatus comprises a memory and a processor coupled to the memory. The processor is configured to receive input from a cloud service data source, wherein the input comprises at least one data point, analyze the data point via a machine learning model to determine characteristics indicated by the data point, determine whether the characteristics indicated by the data point meet an alert threshold that indicates a problem in a network, generate an alert ticket when the characteristics indicated by the data point meet the alert threshold, wherein the alert ticket indicates the problem in the network, communicate with a user based on contents of the alert ticket, receive feedback from the user relating to the alert ticket, and train the machine learning model according to the feedback received from the user.

In yet another embodiment of the present disclosure, a computer program product for machine learning model training is disclosed, the computer program product comprising a computer readable storage medium having program instructions embodied therewith. Executing the instructions causes the processor to analyze a data point to determine parameters of the data point using a machine learning model, generate an alert ticket based on the analysis of the data point when at least some of the parameters of the data point meet an alert threshold, wherein the alert ticket indicates a problem in a network, communicate, via a chatbot, at least some information contained in the alert ticket to a user, receive, via the chatbot, feedback from the user, categorize, via the chatbot, the data point that resulted in the alert ticket based at least in part on the feedback from the user, and train the machine learning model according to the categorized data point.

DETAILED DESCRIPTION

Figure 1:
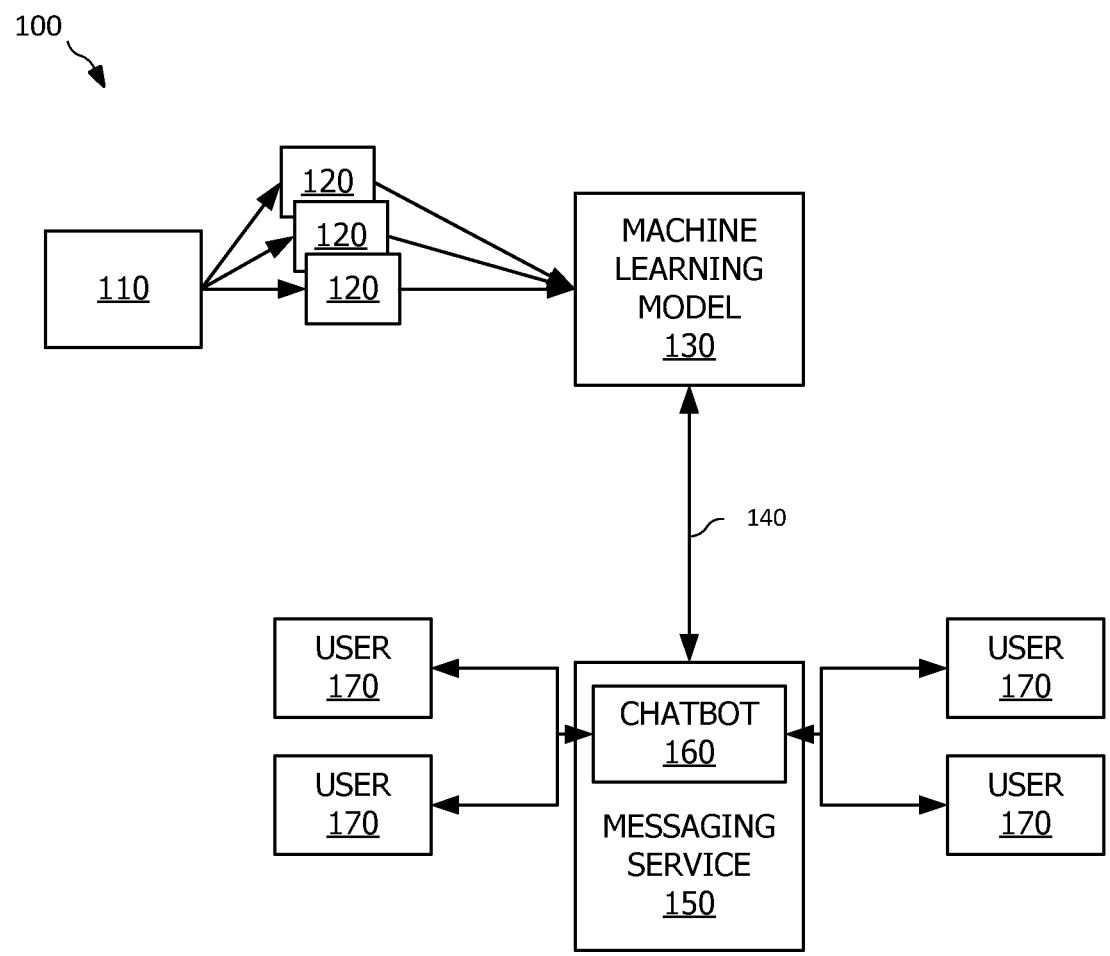
FIG. 1 depicts a block diagram of a system for chatbot-based machine learning model training in accordance with various embodiments.

Cloud-based, or distributed, systems are becoming more prevalent across the technology industry. These systems may introduce added complexity in their monitoring, maintenance, and upkeep due to their distributed nature in which a system may utilize components located in different servers, different server racks, different rooms, and/or different data centers which may be separated by any amount of distance. In some embodiments, the system may self-monitor to identify and/or report issues, or potential issues, to a user. In other embodiments, the monitoring may be performed by a second system communicatively coupled to the first system. To perform the monitoring, a machine learning model may be employed. To maximize an effectiveness of the machine learning model, the machine learning model may be periodically and/or continually trained using new data. Traditionally, the new data may be manually reviewed and labeled in substantially real-time by a human to enable the machine learning model to distinguish between various categories of the data and the parameter conditions or combinations that cause such categorization. Such a data specialist, reviewing and labeling data in real-time for training of the machine learning model, may be impractical due to the volume of data involved in cloud-based systems, the speed at which that data is generated, and an economic cost associated with having a dedicated data specialist for reviewing and labeling data.

Disclosed herein are embodiments that provide for chatbot-based labeling of data points. The data points may be used, for example, in machine learning, such as supervised machine learning, to train a system to pre-emptively identify issues based on data observed by the system and the labeled data points utilized in the machine learning. When a potential issue is identified with the cloud-based system, either by the cloud-based system itself or another system monitoring the cloud-based system, for example, at least partially as a result of a machine learning model, the chatbot may query a user about a nature of the potential issue. The user may respond to the chatbot and the chatbot may utilize the user's response to update parameters associated with the potential issue for subsequent use by the machine learning model in identifying potential issues. For example, the user's response may indicate that the potential issue is a known response and to be considered normal behavior. Alternatively, the user's response may indicate that the potential issue is an abnormal issue that bears investigation and/or corrective measures. In some embodiments, the chatbot may send one or more additional messages and receive one or more additional responses from the user prior to updating the parameters associated with the potential issue, for example, to give the user time to investigate the issue and/or to elicit additional information from the user. The chatbot, in some embodiments, may enable users (e.g., such as administrators of a cloud service, cloud service operators, cloud service technicians, etc.) to perform the data point labeling using a natural language interface in substantially real-time without necessitating specialized data science or machine learning labeling knowledge on the part of the users. Using the disclosed chatbot, unstructured data (e.g., the data point labels) received from users may be used to train a machine learning system.

Referring now to FIG. 1, a block diagram of an embodiment of a system 100 for chatbot-based machine learning model training is shown. In at least some embodiments, the system 100 may comprise, or may be included in, a cognitive computing system. The system 100 includes, in some embodiments, a machine learning model 130 configured to generate an alert ticket 140 and a messaging service 150 configured to implement a chatbot 160 for interacting with one or more users 170. In some embodiments, the machine learning model 130 and the messaging service 150 may be implemented in a same device, while in other embodiments the machine learning model 130 and the messaging service 150 may be implemented in different, or distributed, devices. The system 100 may be implemented within (e.g., as a part of) a system 110 that is being monitored (e.g., a cloud-based or distributed system) or the system 100 may be implemented as a separate system alongside the system 110 being monitored. The system 100 may be implemented proximally to the system 110 being monitored (e.g., in a same server, server rack, room, data center, etc.) or may be implemented geographically independent of the system 110 being monitored (e.g., in a different data center). Additionally, it should be understood that while one system 110 being monitored is shown in FIG. 1, in practice any number of systems 110 may be monitored substantially simultaneously by the system 100. The system 110 being monitored generates one or more real-time data points 120. The real-time data points 120 may include, as non-exclusive examples, a status of one or more electronic components (e.g., such as power consumed, central processing unit (CPU) load, storage capacity used, random access memory (RAM) in use, etc.), a status of one or more communication links (e.g., packets dropped on the communication link, users connected via the communication link, data throughput of the communication link, etc.), or any other suitable criteria related to operations of the system 110.

The machine learning model 130 monitors the system 110 and analyzes the real-time data points 120 in substantially real-time upon their generation by the system 110. The machine learning model 130 analyzes the real-time data points 120, for example, to determine whether a content of one or more of the real-time data points 120, either taken alone or in combination, triggers an alert within the machine learning model 130. The alerts may be preprogrammed in the machine learning model 130, learned by the machine learning model 130 over time from unstructured data (e.g., such as via feedback from the users 170, for example, via the chatbot 160), learned by the machine learning model 130 via structured data (e.g., a training database), or any combination of the foregoing.

When the analysis of the real-time data points 120 by the machine learning model 130 triggers an alert, the machine learning model 130 generates the alert ticket 140 and transmits the alert ticket 140 to the messaging service 150. The alert ticket 140, in some embodiments, may include an identification of a device or system 110 which generated the real-time data points 120 that resulted in the alert, a data and/or time at which the real-time data points 120 that resulted in the alert were generated, the particular parameter or parameters of the real-time data points 120 that triggered the alert, one or more potential causes of the real-time data points 120 that resulted in the alert, and one or more potential solutions for resolving the alert. The potential causes and/or potential solutions may be generated by the machine learning model 130 based on, for example, previous causes and/or previous solutions preprogrammed in the machine learning model 130, learned by the machine learning model 130 over time from unstructured data (e.g., such as via feedback from the users 170, for example, via the chatbot 160), learned by the machine learning model 130 via structured data (e.g., a training database), or any combination of the foregoing. A number of each of the potential causes and/or the potential solutions may be determined, in some embodiments, based on a number of each of the potential causes and/or the potential solutions having a confidence level determined by the machine learning model 130 to exceed a threshold. The threshold may be a predetermined threshold set at a level such that potential causes and/or potential solutions which may be unlikely may not be included in the alert ticket 140. In some embodiments, the machine learning model 130 computes the confidence level of at least some of the potential causes or the potential solutions via at least one of a Bayesian Network or a Neural Network. In other embodiments, the machine learning model 130 computes the confidence level of at least some of the potential causes or the potential solutions via a suitable machine learning process or model.

The chatbot 160 of the messaging service 150 receives the alert ticket 140 from the machine learning model 130 and communicates with at least one of the users 170 based on one or more contents of the alert ticket 140. The users 170, in some embodiments, may be cloud service operators who may be tasked with maintenance and/or upkeep of a cloud service from which the data point was generated. In other embodiments, the users 170 may be customers who utilize a cloud service corresponding to, associated with, or having a relationship to the system 110 being monitored. In yet other embodiments, the users 170 may be a combination of cloud service operators, customers, and/or any other suitable persons. In some embodiments the chatbot 160 communicates at least some information contained in the alert ticket 140 to at least one of the users 170 in an informative manner to alert the user 170 to the existence of the condition that resulted in the alert ticket 140. Subsequently, in some embodiments the chatbot 160 may query the user 170 to clarify and/or acquire unknown information (e.g., such as an actual cause and/or actual solution for the alert ticket 140), whether the condition that resulted in the alert ticket 140 is a known issue, etc. Based on feedback received by the chatbot 160 from the user 170, confidence levels of at least some of the potential causes and/or the potential solutions may be modified by the chatbot 160. Additionally, in some embodiments, the user 170 may propose a cause and/or a solution which is not among the potential causes and/or potential solutions included in the alert ticket 140. In such embodiments, the proposed cause and/or solution may be parsed via natural language processing and added to the alert ticket 140 by the chatbot 160.

The feedback received by the chatbot 160 from the user 170 may be processed, for example, via natural language processing, to enable the chatbot 160 to utilize the feedback received from the user 170. The natural language processing may be performed, in some embodiments, by the chatbot 160 within the system 100, while in other embodiments the natural language processing may be performed by one or more application programming interface (API) calls by the chatbot 160 to natural language processing services located outside of the system 100.

In some embodiments, the chatbot 160 may use the feedback received from the user 170 to categorize the condition that resulted in the alert ticket 140 as either a "normal" behavior or an "abnormal" behavior. The chatbot 160 may additionally identify correlations or relationships between conditions that result in alert tickets 140 and solutions for those conditions. Each of these data elements may, in some embodiments, be used by the chatbot 160 to label the data associated with the alert tickets 140 for use in training the machine learning model 130. After concluding interactions with the user 170 relating to the alert ticket 140 and labeling the data associated with the alert ticket 140, the chatbot 160 may transmit the alert ticket 140 back to the machine learning model 130 to enable the machine learning model 130 to utilize the feedback received from the user 170 for training. The training enables the machine learning model 130, in some embodiments, to improve an accuracy of prediction of potential causes of real-time data points 120. Such increased accuracy resulting from training of the machine learning model 130, in some embodiments, may enable transmission of a recommendation to one or more users (e.g., such as one or more of the users 170) for taking pre-emptive action to prevent a condition which may result in an alert ticket 140. In other embodiments, the system 100 may itself perform the pre-emptive action to prevent a condition which may result in an alert ticket 140. The pre-emptive action may be, for example, taking a device offline, restarting a device, shutting down a device, blocking one or more network connections of the device (e.g., one or more network ports determined to potentially be under attack), etc. Taking the pre-emptive action, in some embodiments, may result in an increased uptime of an offered service that, at least in part, utilizes the device in offering the service. Such an increased uptime, in some embodiments, results in an improved user experience for users utilizing the offered service.

Figure 2:
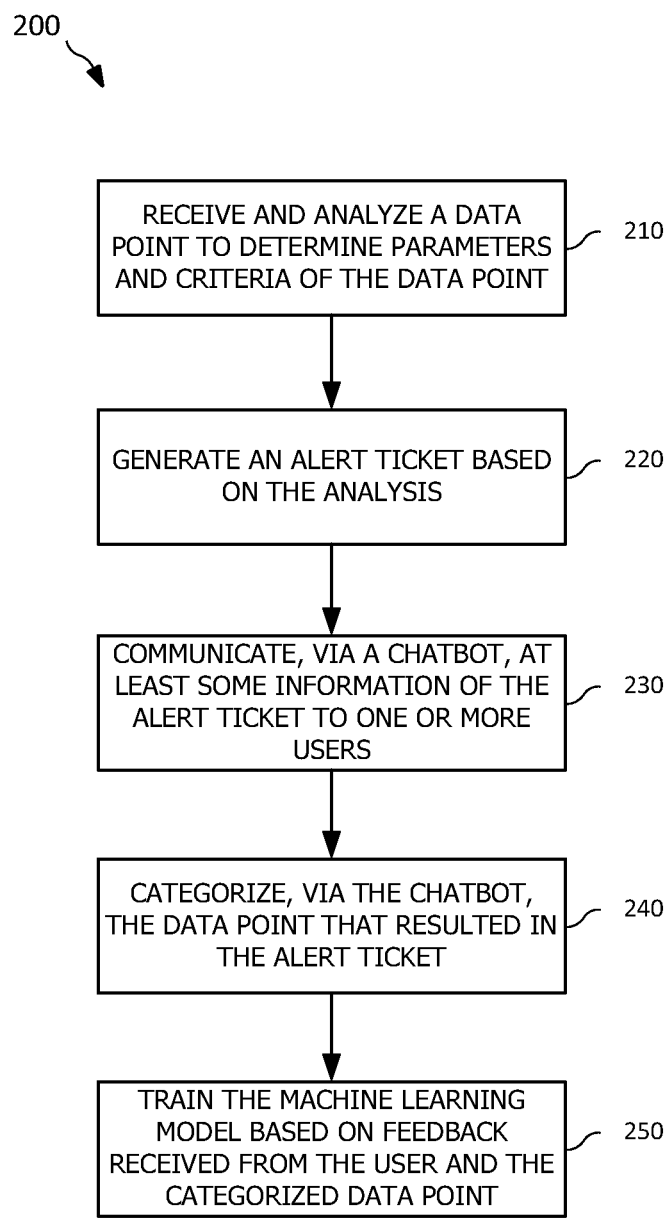
FIG. 2 depicts a flowchart of a method for machine learning model training in accordance with various embodiments.

With reference now to FIG. 2, a flowchart of an embodiment of a method 200 of machine learning model training is shown. The method 200 is implemented, for example, by a system such as the system 100 in response to the generation of a data point for analysis by the system, such as a real-time data point 120 generated by the system 110. At operation 210, the system receives and analyzes the data point to determine parameters and criteria of the data point. For example, the system may analyze the data point to determine a CPU usage indicated by the data point, RAM usage indicated by the data point, an amount of packet loss indicated by the data point, network throughput indicated by the data point, a device operating temperature indicated by the data point, or various other characteristics or parameters of the data point. In some embodiments, the analysis is performed by a machine learning model that has been trained, at least partially, according to feedback received by a chatbot from users. In some embodiments, analyzing the data point may result in an analysis report. The analysis report may include, for example, any one or more of a timestamp, an indication of a device that generated the data point, a problem or potential problem identified via the analysis, a predicted severity of the problem or potential problem, a potential reason or cause for the problem or potential problem, and a classification (e.g., normal or abnormal behavior) based on at least some of the foregoing characteristics.

At operation 220, the system generates an alert ticket based on the analysis. The system may generate the alert ticket, for example, when one or more characteristics of the data point (or the data point when taken in combination with at least one characteristic of one or more other data points), meets an alert threshold. For example, based on previously observed conditions, training based on responses from users to previous alerts, and/or other forms of data, the system may determine that one or more of the characteristics of the data point meet an alert threshold. For example, the alert threshold may be that the CPU usage has been high for a certain period of time, the CPU usage has exceeded a predetermined percentage of a maximum capability, the CPU usage demonstrates characteristics similar to previous outage scenarios, a number of packets lost or dropped in transmission exceeds a predetermined threshold number, etc. The alert ticket may include various information such as, for example, the timestamp of the data point from which the alert ticket was generated, the device that the data point from which the alert ticket was generated, a reason that the alert ticket was generated, one or more potential causes of the alert ticket, and one or more potential solutions for the alert ticket. The potential causes and potential solutions for the alert ticket may, in some embodiments, each be associated with a confidence level determined by the system based on a machine learning model, previously observed conditions, training based on responses from users to previous alerts, and/or other forms of data.

At operation 230, a chatbot of the system communicates at least some of the information of the alert ticket to one or more users. The communication may be, for example, in a natural language format. The communication may be text based, audio based, video based, or any other form of communication that allows the chatbot to provide information to a user and receive feedback from the user in response. In some embodiments, the chatbot may send the information to one of the users based on an availability of the user (e.g., when the chatbot determines that the user is available to respond with feedback). In other embodiments, the chatbot may send information for certain alert tickets (e.g., alert tickets having one or more characteristics in common) to one or more predefined users who, for example, may specialize or have particular experience in dealing with a problem indicated by the alert ticket. In yet other embodiments, the chatbot may send the information for the alert ticket to multiple users such that feedback may be elicited from a plurality of users in a crowdsource manner. Such a crowdsourced manner of eliciting feedback to an alert ticket may mitigate a bias in alert ticket feedback that may be inherent to scenarios in which only one user provides feedback to an alert ticket.

Subsequent (or substantially consecutively) to communicating the information to the users, the chatbot may query the users for additional information relating to the alert ticket. For example, the chatbot may query the users to determine whether the behavior noted by the alert ticket is normal (or abnormal) behavior for the device noted in the alert ticket, what causes (or caused) the behavior noted by the alert ticket, what steps (if any) were taken to resolve the behavior noted by the alert ticket, and/or any other information which might be helpful in processing subsequent alert tickets or data points having similar characteristics in the future. The chatbot may receive feedback from the users in response to the information and/or the queries. The feedback may, for example, confirm a potential cause or potential solution as being accurate, indicate the alert ticket reflects normal behavior, indicate the alert ticket reflects abnormal behavior, or other such forms of feedback. In some embodiments, the system (e.g., via the chatbot) may perform natural language processing on the feedback received from the users.

At operation 240, the system, via the chatbot, categorizes the data point that resulted in the alert ticket into either "normal" or "abnormal" behavior of the device that generated the data point. The categorization is based, at least in part, on the feedback received from the user. Optionally, the chatbot may further identify correlations and/or relationships between a cause of the alert ticket and a solution for the alert ticket, for example, based at least in part on the feedback received from the user. The categorization and the correlation between the cause and solution for the alert ticket may be used by the system to label the data point and/or the alert ticket for use in training the machine learning model.

At operation 250, the system trains the machine learning model based on the feedback received from the user and the categorized data point. Training the machine learning model based on user feedback provided to the chatbot, in some embodiments, enables the machine learning model to more accurately predict causes and solutions for alert tickets, as well as, optionally, provide pre-emptive maintenance recommendations to one or more of the users. For example, when the training may include modifying a confidence level of at least one of the potential causes of the alert ticket and/or at least one of the potential solutions for the alert ticket. The training may also include adding a new cause of the alert ticket and/or solution for the alert ticket to a list or database of potential causes and/or potential solutions for use in analyzing the data point and generating the alert ticket. The training may also include designating a potential cause and/or a potential solution as incorrect and/or designating a potential cause and/or a potential solution as correct. Based on the training of the machine learning model, the system may include different potential causes and/or potential solutions in a subsequent alert ticket and/or indicate different confidence levels in potential causes and/or potential solutions included in a subsequent alert ticket.

In some embodiments, the system may take pre-emptive or corrective measures automatically based on a cause and/or solution determined by the machine learning model analysis of the data point. The pre-emptive or corrective measures may be based, at least in part, on user feedback provided to the chatbot in response to a previously generated alert ticket.

Figure 3:
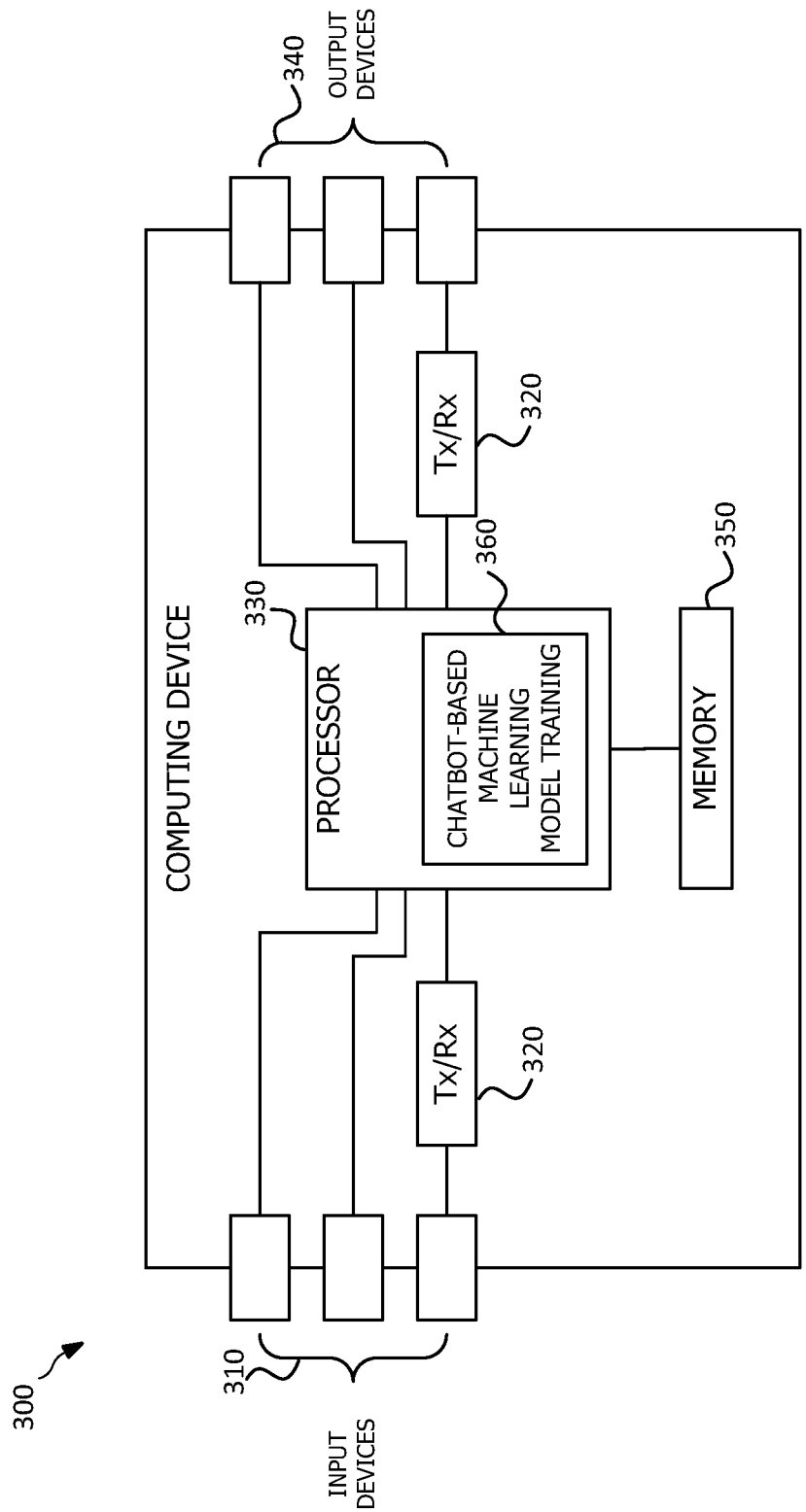
FIG. 3 depicts a computing device in accordance with various embodiments.

With reference now to FIG. 3, a schematic diagram of a computing device 300 according to various embodiments is shown. Computing device 300 may be any suitable processing device capable of performing the functions disclosed herein such as a computer system, a server, a cloud computing node, a cognitive computing system, or may be generally representative of a distributed computing device in which one or more components of computing device 300 are distributed or shared across one or more devices. Computing device 300 is configured to implement at least some of the features/methods disclosed herein, for example, the chatbot-based machine learning model training of system 100 (e.g., the computing device 300 may be comprise, or be implemented as, any of system 100, system 110, machine learning model 130, messaging service 150, and/or chatbot 160) and/or the machine learning model training of method 200, discussed above. In various embodiments, for instance, the features/methods of this disclosure are implemented using hardware, firmware, and/or software (e.g., such as software modules) installed to run on hardware.

Computing device 300 is a device (e.g., a computer system, a user equipment, a network device, a server, a cloud computing node, an automated assistant, a robotic system, etc.) that receives input originating from one or more data sources (e.g., devices or nodes associated with providing a service to a customer), analyzes the input using a machine learning model to determine whether an alert ticket is appropriate, generates an alert ticket, communicates with a user relating to the alert ticket, and uses feedback from the user to train and refine the machine learning model. The computing device 300 may be an all-in-one device that performs each of the aforementioned operations, or the computing device may be a node that performs any one or more, or portion of one or more, of the aforementioned operations. In one embodiment, the computing device 300 is an apparatus and/or system configured to implement the chatbot-based machine learning model training of system 100 and/or the machine learning model training of method 200, for example, according to a computer program product executed on, or by, at least one processor.

The computing device 300 comprises one or more input devices 310. Some of the input devices 310 may be microphones, keyboards, touchscreens, buttons, toggle switches, or any other device or component that allows a user to interact with, and provide input to, the computing device 300. Some other of the input devices 310 may be downstream ports coupled to a transceiver (Tx/Rx) 320, which are transmitters, receivers, or combinations thereof. The Tx/Rx 320 transmits and/or receives data to and/or from other computing devices via at least some of the input devices 310. Similarly, the computing device 300 comprises a plurality of output devices 340. Some of the output devices 340 may be speakers, a display screen (which may also be an input device such as a touchscreen), lights, or any other device that allows a user to interact with, and receive output from, the computing device 300. At least some of the output devices 340 may be upstream ports coupled to another Tx/Rx 320, wherein the Tx/Rx 320 transmits and/or receives data from other nodes via the upstream ports. The downstream ports and/or the upstream ports may include electrical and/or optical transmitting and/or receiving components. In another embodiment, the computing device 300 comprises one or more antennas (not shown) coupled to the Tx/Rx 320. The Tx/Rx 320 transmits and/or receives data from other computing or storage devices wirelessly via the one or more antennas.

A processor 330 is coupled to the Tx/Rx 320 and at least some of the input devices 310 and/or output devices 340 and is configured to perform the chatbot-based machine learning model training, for example, by processing feedback from a user received in response to presentation to the user of information determined by a machine learning model to utilize the feedback to train the machine learning model. In an embodiment, the processor 330 comprises one or more multi-core processors and/or memory modules 350, which functions as data stores, buffers, etc. The processor 330 is implemented as a general processor or as part of one or more application specific integrated circuits (ASICs), field-programmable gate arrays (FPGAs), and/or digital signal processors (DSPs). Although illustrated as a single processor, the processor 330 is not so limited and alternatively comprises multiple processors. The processor 330 further comprises processing logic configured to execute a chatbot-based machine learning model training computer program product 360 that is configured to process feedback from a user received in response to presentation to the user of information determined by a machine learning model to utilize the feedback to train the machine learning model, for example, according to the system 100 and/or the method 200, discussed above.

FIG. 3 also illustrates that a memory module 350 is coupled to the processor 330 and is a non-transitory medium configured to store various types of data. Memory module 350 comprises memory devices including secondary storage, read-only memory (ROM), and RAM. The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 350 may be used to house the instructions for carrying out the various embodiments described herein. For example, the memory module 350 may comprise the chatbot-based machine learning model training computer program product 360, which is executed by processor 330.

It is understood that by programming and/or loading executable instructions onto the computing device 300, at least one of the processor 330 and/or the memory module 350 are changed, transforming the computing device 300 in part into a particular machine or apparatus, for example, a chatbot-based machine learning model training device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages, and/or functional programming languages such as Haskell. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
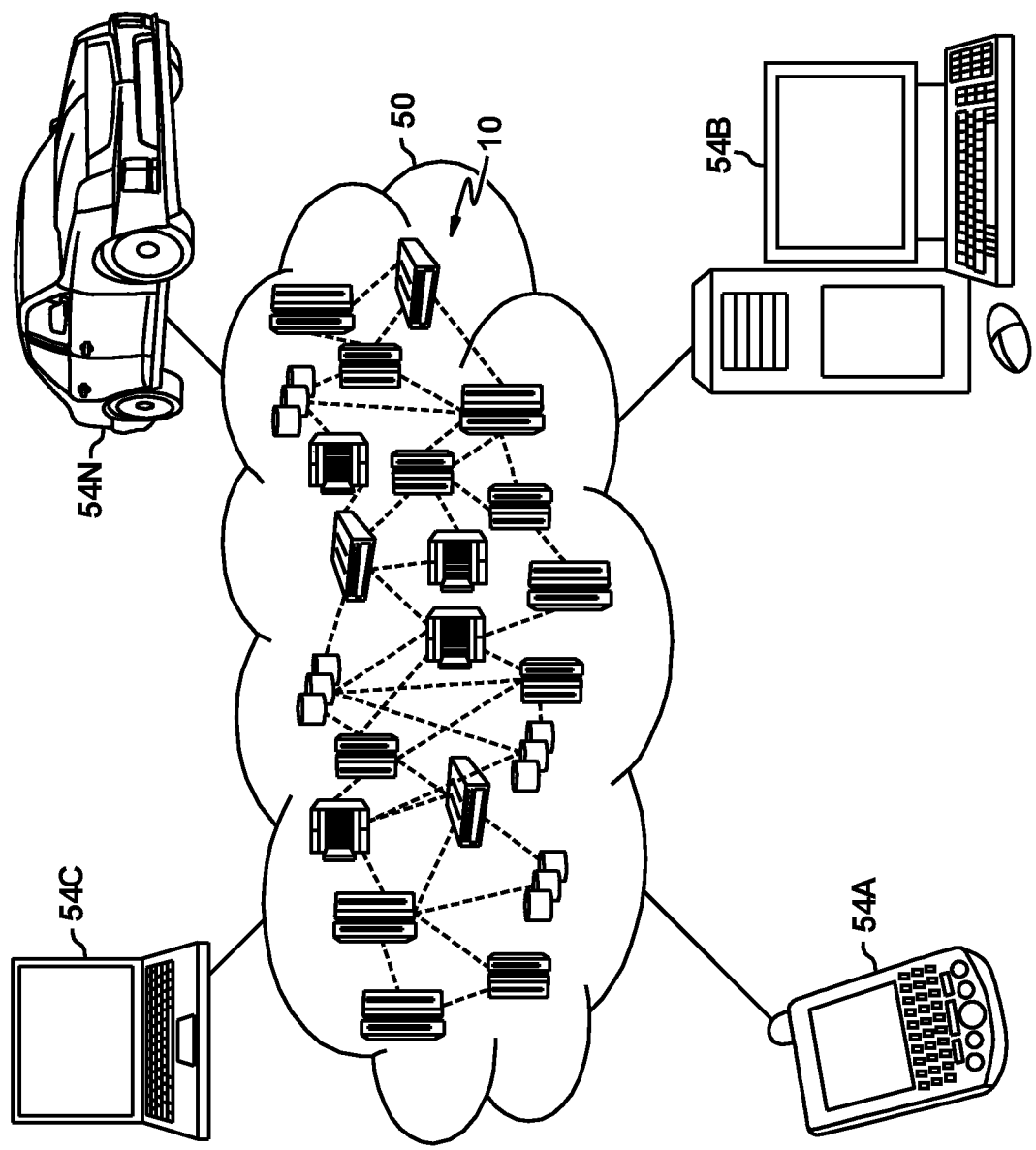
FIG. 4 depicts a cloud computing environment in accordance with various embodiments.
Figure 5:
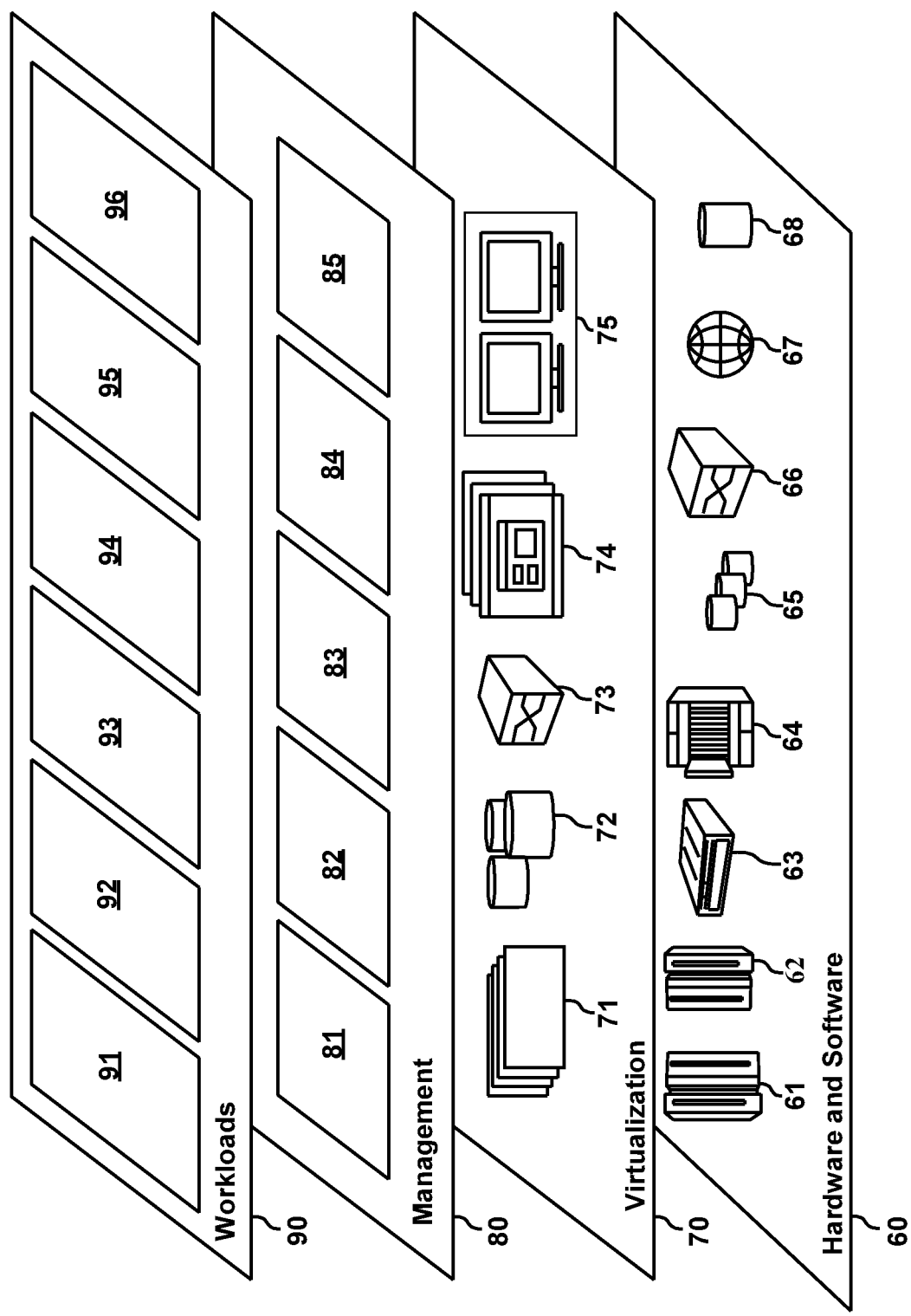
FIG. 5 depicts abstraction model layers in accordance with various embodiments.

Turning now to FIGS. 4 and 5, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the speculative processing described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtualization layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single architecture based server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment 50. Metering and Pricing 82 provide cost tracking as resources are utilized within the cloud computing environment 50, and billing or invoicing for consumption of these resources. In one example, these resources may include application software licenses. Security provides identity verification for cloud consumers and tasks, as well as protection for data and other resources. User portal 83 provides access to the cloud computing 50 environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment 50 may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and speculative processing 96. These workloads and functions of workloads layer 90 may be end-user applications that enable a subscriber to cloud computing environment 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing environment 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about", "approximately", or "substantially" preceding a value means+/−10 percent of the stated value or reference.

What is claimed is:

1. An apparatus comprising:
   a memory; and
   a processor coupled to the memory and configured to:
     receive input from a cloud service data source, wherein the input comprises at least one data point;
     analyze the data point via a machine learning model to determine characteristics indicated by the data point using a machine learning model;
     determine whether the characteristics indicated by the data point meet an alert threshold that indicates a problem in a network;
     generate an alert ticket based on the analysis of the data point when the characteristics indicated by the data point meet the alert threshold, wherein the alert ticket indicates the problem in the network;
     communicate, via a chatbot, with a user based on contents of the alert ticket;
     receive, via the chatbot, feedback from the user relating to the alert ticket; categorize, via the chatbot, the data point that resulted in the alert ticket based at least in part on the feedback from the user; and
     train the machine learning model according to the feedback received from the user.

2. The apparatus of claim 1, wherein the processor further:
   communicates with a plurality of users based on the contents of the alert ticket to receive feedback from the plurality of users relating to the alert ticket; and
   trains the machine learning model according to the feedback from the plurality of users.

3. The apparatus of claim 1, wherein the feedback from the user comprises a cause of the problem in the network.

4. The apparatus of claim 1, wherein the feedback from the user comprises a solution for the problem in the network.

5. The apparatus of claim 1, wherein the alert ticket comprises:
   an identification of a device in the network that generated the at least one data point,
   an indication of a time at which the device in the network generated the at least one data point;
   the problem in the network indicated by the characteristics of the data point;
   a potential cause for the problem in the network; and
   a potential solution for the problem in the network.

6. The apparatus of claim 5, wherein the feedback from the user comprises feedback relating to at least one of the potential cause for the problem in the network or the potential solution for the problem in the network.

7. The apparatus of claim 1, wherein training the machine learning module comprises modifying a confidence level in at least one of a potential cause determined by the machine learning model for the problem in the network or a potential solution determined by the machine learning model for the problem in the network based at least in part on the feedback received from the user.

8. A computer program product for machine learning model training, the computer program product comprising a computer readable storage medium having program instructions embodied therewith, the program instructions executable by a processor to cause the processor to:
   analyze a data point to determine parameters of the data point using a machine learning model;
   generate an alert ticket based on the analysis of the data point when at least some of the parameters of the data point meet an alert threshold, wherein the alert ticket indicates a problem in a network;
   communicate, via a chatbot, at least some information contained in the alert ticket to a user;
   receive, via the chatbot, feedback from the user;
   categorize, via the chatbot, the data point that resulted in the alert ticket based at least in part on the feedback from the user; and
   train the machine learning model according to the categorized data point.

9. The computer program product of claim 8, wherein the alert ticket comprises:

an identification of a device in the network that generated the data point, an indication of a time at which the device in the network generated the data point;

the problem in the network indicated by the parameters of the data point;

a potential cause for the problem in the network; and a potential solution for the problem in the network.

10. The computer program product of claim 9, wherein training the machine learning model comprises modifying a confidence level in at least one of the potential cause for the problem in the network or the potential solution for the problem in the network based at least in part on the categorized data point.

11. The computer program product of claim 9, wherein the feedback from the user indicates that the potential cause of the problem in the network is correct, and wherein training the machine learning model comprises confirming the potential cause of the problem in the network as a cause of the problem in the network corresponding to the parameters of the data point.

12. The computer program product of claim 9, wherein the feedback from the user indicates that the potential cause of the problem in the network is not correct, and wherein training the machine learning model comprises assigning the potential cause of the problem in the network as not a cause of the problem in the network corresponding to the parameters of the data point.

13. The computer program product of claim 8, wherein executing the instructions further causes the processor to perform maintenance on the network according to an analysis of a subsequent data point according to the trained machine learning model, wherein performing the maintenance comprises at least one of preventing a problem with the network or solving a problem with the network according to the analysis of the subsequent data point, the feedback from the user, and the categorized data point.

14. A computer-implemented method, comprising:

receiving input from a cloud service data source, wherein the input comprises at least one data point;

analyzing the data point via a machine learning model to determine characteristics indicated by the data point using a machine learning model;

determining whether the characteristics indicated by the data point meet an alert threshold that indicates a problem in a network;

generating an alert ticket based on the analysis of the data point when the characteristics indicated by the data point meet the alert threshold, wherein the alert ticket indicates the problem in the network;

communicating, via a chatbot, with a user based on contents of the alert ticket;

receiving, via the chatbot, feedback from the user relating to the alert ticket; categorize, via the chatbot, the data point that resulted in the alert ticket based at least in part on the feedback from the user; and training the machine learning model according to the feedback received from the user.

15. The computer-implemented method of claim 14, further comprising:

communicating with a plurality of users based on the contents of the alert ticket to receive feedback from the plurality of users relating to the alert ticket; and training the machine learning model according to the feedback from the plurality of users.

16. The computer-implemented method of claim 14, wherein the feedback from the user comprises a cause of the problem in the network.

17. The computer-implemented method of claim 14, wherein the feedback from the user comprises a solution for the problem in the network.

18. The computer-implemented method of claim 14, wherein the alert ticket comprises:

an identification of a device in the network that generated the at least one data point, an indication of a time at which the device in the network generated the at least one data point;

the problem in the network indicated by the characteristics of the data point;

a potential cause for the problem in the network; and a potential solution for the problem in the network.

19. The computer-implemented method of claim 18, wherein the feedback from the user comprises feedback relating to at least one of the potential cause for the problem in the network or the potential solution for the problem in the network.

20. The computer-implemented method of claim 14, wherein training the machine learning module comprises modifying a confidence level in at least one of a potential cause determined by the machine learning model for the problem in the network or a potential solution determined by the machine learning model for the problem in the network based at least in part on the feedback received from the user.

* * * * *